US009852768B1

(12) United States Patent
Oh et al.

(10) Patent No.: US 9,852,768 B1
(45) Date of Patent: *Dec. 26, 2017

(54) VIDEO EDITING USING MOBILE TERMINAL AND REMOTE COMPUTER

(71) Applicant: Maverick Co., Ltd., Seoul (KR)

(72) Inventors: Joo Hyun Oh, Seoul (KR); Min Jung, Namyangju (KR); Byulsaim Kwak, Namyangju (KR)

(73) Assignee: Maverick Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,209

(22) Filed: Jun. 24, 2016

Related U.S. Application Data

(63) Continuation of application No. 15/173,586, filed on Jun. 3, 2016.

(51) Int. Cl.
*H04N 5/93* (2006.01)
*G11B 27/034* (2006.01)
*G11B 27/038* (2006.01)
*G11B 27/36* (2006.01)

(52) U.S. Cl.
CPC .......... *G11B 27/034* (2013.01); *G11B 27/038* (2013.01); *G11B 27/36* (2013.01)

(58) Field of Classification Search
CPC ..... G11B 27/02; G11B 27/031; G11B 27/034; G11B 27/036; G06F 3/04847; H04N 21/47205
USPC ........................................................ 386/280
See application file for complete search history.

(56) References Cited

U.S. PATENT DOCUMENTS

| 5,546,518 A * | 8/1996 | Blossom ............... G06T 15/503 345/473 |
| 2004/0150663 A1* | 8/2004 | Kim ..................... G11B 27/034 715/723 |
| 2006/0277209 A1* | 12/2006 | Kral ......................... A63F 13/12 |
| 2007/0277108 A1* | 11/2007 | Orgill .................... G06F 17/248 715/730 |
| 2008/0046925 A1* | 2/2008 | Lee ................... G06F 17/30817 725/37 |

(Continued)

FOREIGN PATENT DOCUMENTS

| KR | 10-2012-0039229 A | 4/2012 |
| KR | 10-2014-0017303 A | 2/2014 |
| KR | 10-1528312 B1 | 6/2015 |

*Primary Examiner* — David Harvey
(74) *Attorney, Agent, or Firm* — Knobbe Martens Olson & Bear LLP

(57) ABSTRACT

A method for video editing using a mobile terminal and a remote computer is disclosed. A user selects a user video to edit using a mobile application of the mobile terminal. The user selects a visual effect and parameters of the visual effect using the mobile application. Subsequently, the mobile application provides a preview of the visual effect superimposed over the user video using a series of still images representing the visual effect. When the user confirms the preview, the mobile terminal generates a request for video editing and sends the request to a server. The request includes identification of the visual effect for combining the visual effect and the user video as confirmed by the preview. Based on the request from the mobile terminal, the server combines a video clip of the visual effect and the user video into a resulting video.

20 Claims, 12 Drawing Sheets

(56) References Cited

U.S. PATENT DOCUMENTS

| | | | |
|---|---|---|---|
| 2008/0177630 A1* | 7/2008 | Maghfourian | G06Q 30/02 |
| | | | 705/14.56 |
| 2010/0169779 A1* | 7/2010 | Mason | G06F 17/30056 |
| | | | 715/717 |
| 2010/0260468 A1* | 10/2010 | Khatib | G06F 11/0757 |
| | | | 386/278 |
| 2011/0311199 A1* | 12/2011 | Fay | G11B 27/034 |
| | | | 386/241 |
| 2012/0251080 A1 | 10/2012 | Svendsen et al. | |
| 2013/0275232 A1 | 10/2013 | Oh et al. | |
| 2013/0286025 A1* | 10/2013 | Spells, III | G06T 13/20 |
| | | | 345/473 |
| 2014/0123041 A1 | 5/2014 | Morse et al. | |
| 2015/0050009 A1* | 2/2015 | Svendsen | G11B 27/036 |
| | | | 386/280 |
| 2015/0264557 A1 | 9/2015 | Exterman | |
| 2015/0281305 A1 | 10/2015 | Sievert et al. | |
| 2016/0006946 A1 | 1/2016 | Cohen et al. | |

\* cited by examiner

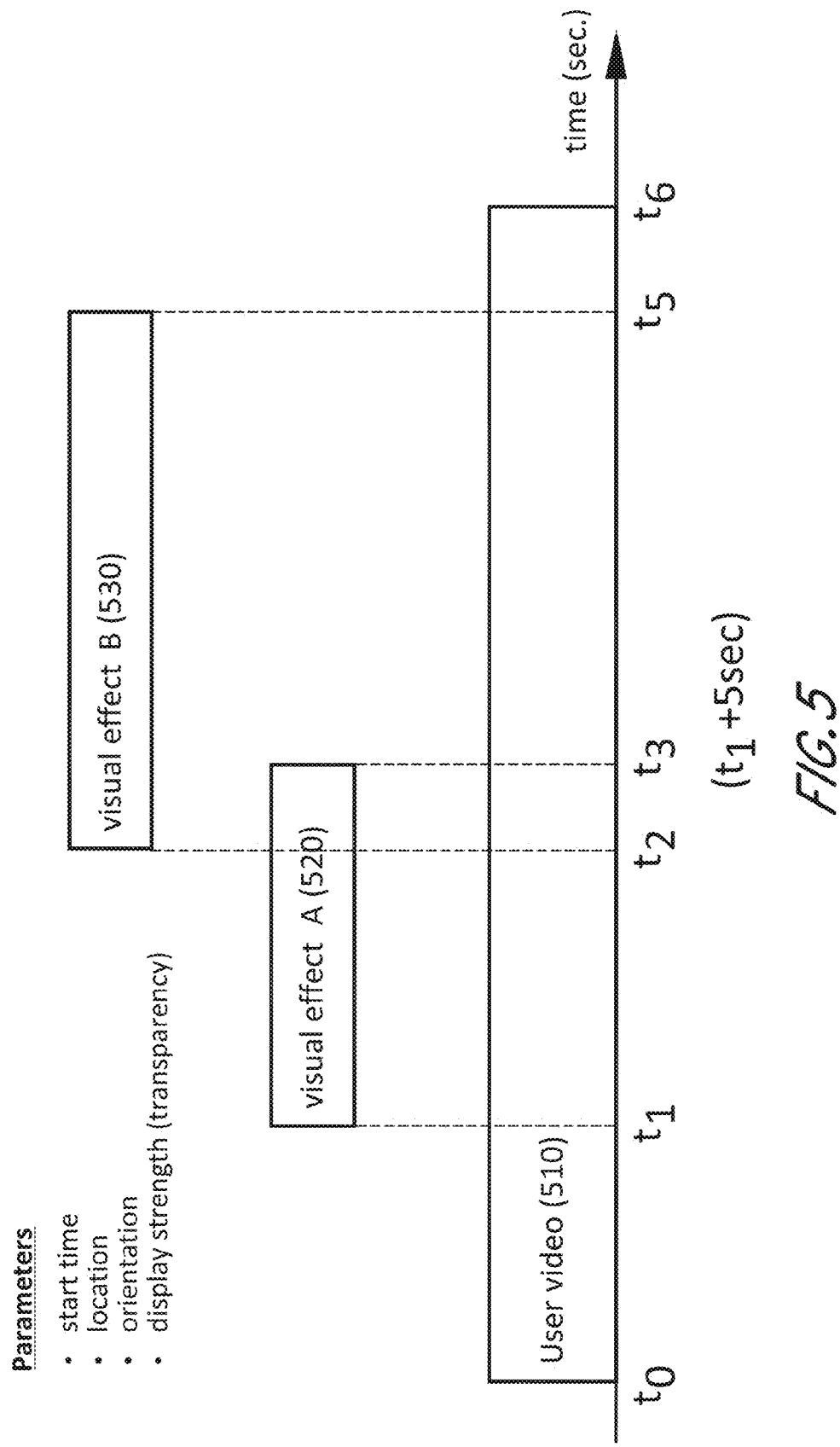

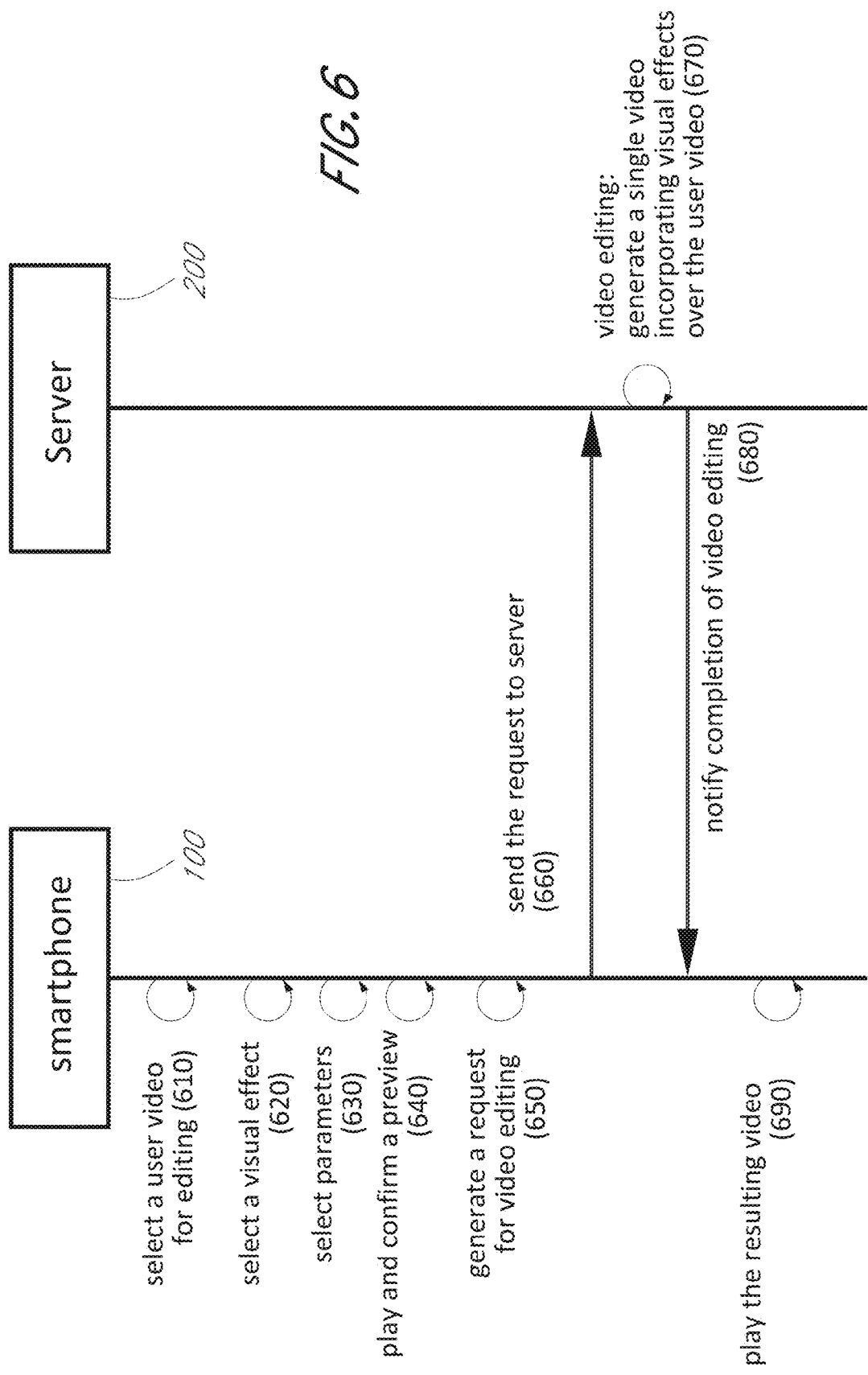

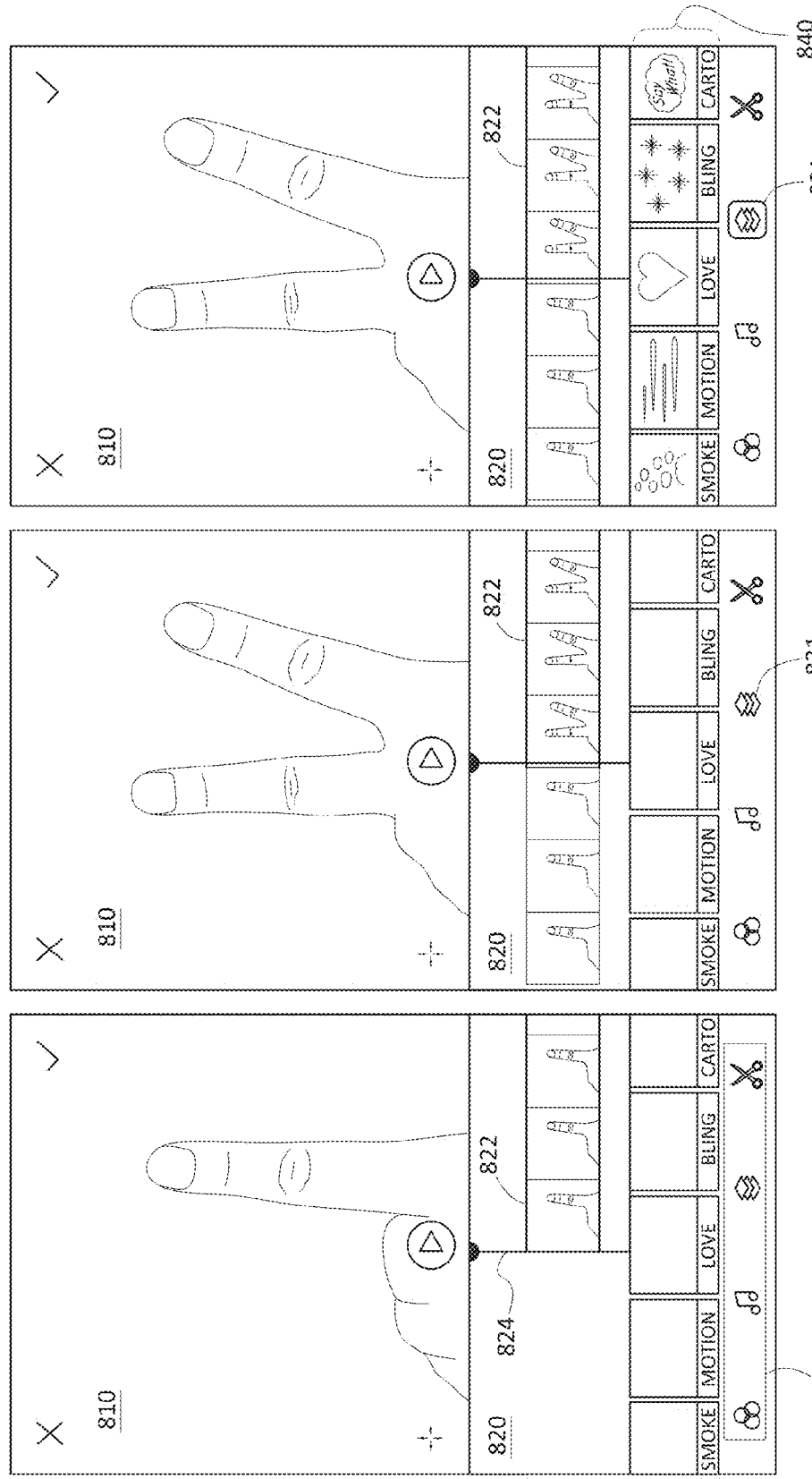

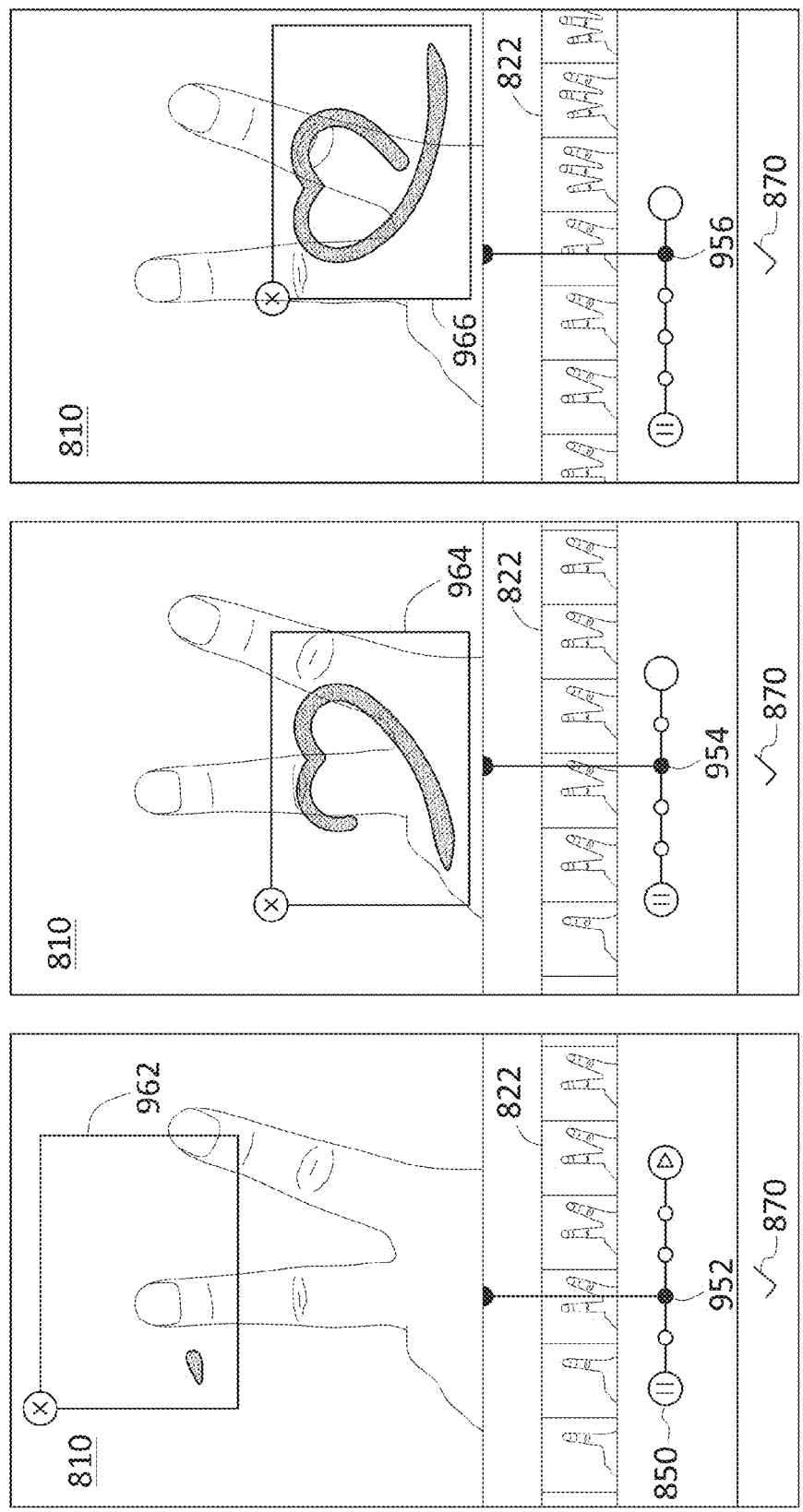

VIDEO EDITING USING MOBILE TERMINAL AND REMOTE COMPUTER

BACKGROUND

Field

The present disclosure relates to video editing. More specifically, the present disclosure relates to video editing using a mobile terminal and at least one remote computer.

Discussion of Related Technology

People use smartphones to take and edit videos. Simple video editing like trimming can be done on smartphones. Smartphones may not have processing power or functions of more complex video editing like superimposing visual objects. More complex editing is typically performed using desktop computers or specialized systems.

SUMMARY

One aspect of the invention provides a method of video editing. The method comprises: providing a video editing mobile application on a mobile terminal, wherein the video editing mobile application does not have the capability of video editing to overlay a user selected visual effect video clip over a user selected user video for generating a single resulting video while the video editing mobile application offers video editing of adding the user selected visual effect video clip to the user selected user video by computing power of one or more remote computers, wherein the video editing mobile application comprises alpha-format still images corresponding to each of a plurality of visual effects offered therein; receiving a user command for selecting a first user video for editing; receiving at least one user command for adding a first one of the plurality of visual effects to the user selected first user video, wherein adding involves selecting the first visual effect, and selecting a first time window for adding the first visual effect within a time span of the first user video; providing a preview displaying a series of alpha-format still images over the first user video to emulate the first visual effect over the first user video without generating a single video clip in which the first visual effect overlays the first user video; in response to a user's confirmation of the preview, uploading, to at least one remote computer, command data for adding the first visual effect to the first user video at the first time window and at the at least one location such that the at least one remote computer performs video editing of combining a first alpha-format video clip for the first visual effect with the first user video in accordance with the command data to generate, a single resulting video in which the first alpha-format video clip for the first visual effect overlays the first user video at the first time window and at the at least one location; and receiving the single resulting video for playing on the mobile terminal, wherein each still image of the series of alpha-format still images comprises a non-transparent visual effect with a transparent background, wherein the first alpha-format video clip comprises a non-transparent visual effect with a transparent background.

In the above-described method, the command data identifies the first user video, identifies the first visual effect, specifies the first time window for adding the first visual effect within the time span of the first user video. Adding further involves selecting at least one location for adding the first visual effect within a display area of the first user video, wherein the command data further specifies the at least one location for adding the first visual effect within the display of the first user video. The series of alpha-format still images comprises a first alpha-format still image and a second alpha-format still image immediately following the first alpha-format still image, wherein in the preview the series of alpha-format still images are displayed in sequence such that at a first point in time of the preview, the first alpha-format still image is displayed alone and that at a second point in time of the preview subsequent to the first point, the second alpha-format still image is displayed alone, wherein there is no overlap of two or more alpha-formal still images at a given point in time of the preview. Still in the above-described method, the series of alpha-format still images comprises a first alpha-format still image and a second alpha-format still image immediately following the first alpha-format still image, wherein in the preview the series of alpha-format still images are displayed in sequence such that at a first point in time of the preview, the first alpha-format still image is displayed alone and that at a second point in time of the preview subsequent to the first point, the first and second alpha-format still images are displayed together. At a third point in time of the preview subsequent to the second point, the second alpha-format still image is displayed alone. At the second point, display strength of the non-transparent visual effect of the first alpha-format still image is lower than display strength of the non-transparent visual effect of the first alpha-format still image, displayed at the first point such that the non-transparent visual effect of the first alpha-format still image fades out over time from the first point to the second point. The mobile application comprises a visual effect library storing the series of alpha-format still images for the first visual effect, wherein the visual effect library does not store or comprise an alpha-format video clip for the first visual effect.

Another aspect of the invention provides a mobile terminal comprising a touch screen display, a memory and at least one processor, wherein the mobile terminal comprises video editing mobile application software stored in the memory for executing using the at least one processor, wherein the video editing mobile application software does not have the capability of video editing to overlay a user selected visual effect video clip over a user selected user video for generating a single resulting video while offering video editing of adding the user selected visual effect video clip to the user selected user video by computing power of one or more remote computers, the video editing mobile application comprising alpha-format still images corresponding to each of a plurality of visual effects offered therein, the video editing mobile application software configured: to receive a user command for selecting a first user video for editing; to receive at least one user command for adding a first one of the plurality of visual effects to the user selected first user video, wherein adding the first visual effect to the first user video involves selecting the first visual effect, and selecting a first time window for adding the first visual effect within a time span of the first user video; to provide a preview displaying a series of alpha-format still images over the first user video to emulate the first visual effect over the first user video without generating a single video clip in which the first visual effect overlays the first user video; in response to a user's confirmation of the preview, to upload, to at least one remote computer, command data for adding the first visual effect to the first user video at the first time window and at the at least one location such that the at least one remote computer performs video editing of combining a first alpha-format video clip for the first visual effect with the first user video in accordance with the command data to generate a single resulting video in which the first alpha-format video clip for the first visual effect overlays the first user video at the first time window and at the at least one location; and to receive the single resulting video for playing on the mobile terminal, wherein each still image of the series of alpha-format still images comprises a non-transparent visual effect with a transparent background, wherein the first alpha-format video clip comprises a non-transparent visual effect with a transparent background.

In the above-described mobile terminal, the command data identifies the first user video, identifies the first visual effect, specifies the first time window for adding the first visual effect within the time span of the first user video, and specifies the at least one location for adding the first visual effect within the display of the first user video. Adding further involves selecting at least one location for adding the first visual effect within a display area of the first user video, wherein the command data further specifies the at least one location for adding the first visual effect within the display of the first user video. The series of alpha-format still images comprises a first alpha-format still image and a second alpha-format still image immediately following the first alpha-format still image, wherein in the preview of the series of alpha-format still images are displayed at a regular time interval in sequence such that at a first point in time of the preview, the first alpha-format still image is displayed alone and that at a second point in time of the preview subsequent to the first point, the second alpha-format still image is displayed alone, wherein there is no overlap of two or more alpha-format still images at a given point in time of the preview.

Still in the above-described mobile terminal, the series of alpha-format still images comprises a first alpha-format still image and a second alpha-format still image immediately following the first alpha-format still image, wherein in the preview of the series of alpha-format still images are displayed at a regular time interval in sequence such that at a first point in time of the preview, the first alpha-format still image is displayed alone and that at a second point in time of the preview subsequent to the first point, the first and second alpha-format still images are displayed together. At a third point in time of the preview subsequent to the second point, the second alpha-format still image is displayed alone. At the second point, display strength of the non-transparent visual effect of the first alpha-format still image is lower than display strength of the non-transparent visual effect of the first alpha-format still image displayed at the first point such that the non-transparent visual effect of the first alpha-format still image fades out over time from the first point to the second point. The mobile application comprises a visual effect library storing the series of alpha-format still images for the first visual effect, wherein the visual effect library does not store or comprise an alpha-format video clip for the first visual effect.

BRIEF DESCRIPTION OF THE DRAWINGS

FIG. 5 illustrates superimposing visual effects over a user video according to embodiments.

FIG. 6 illustrates a procedure of video editing according to embodiments.

FIG. 7A illustrates an interface of mobile application when a user video is selected according to embodiments.

FIG. 7B illustrates an interface of mobile application when a user navigates a user video according to embodiments.

FIG. 7C illustrates an interface of mobile application when a user enters a command for adding a visual effect using according to embodiments.

FIGS. 9A-9C illustrate setting locations of visual effect on a mobile application according to embodiments.

The drawings are provided to illustrate examples and embodiments described herein and are not intended to limit the scope of the invention.

DETAILED DESCRIPTION OF EMBODIMENTS

Figure 1:
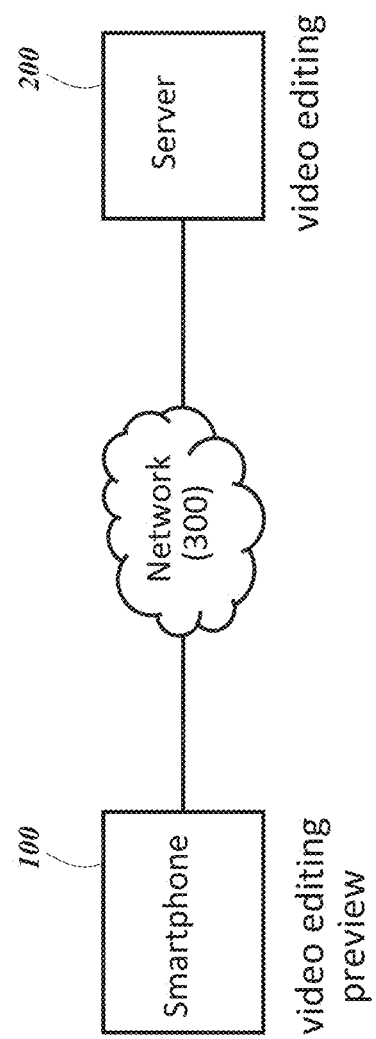
FIG. 1 illustrates a video editing system according to embodiments.

Embodiments of the invention will now be described with reference to the accompanying drawings. The terminology used in the description presented herein is not intended to be interpreted in any limited or restrictive manner, simply because it is being utilized in conjunction with a detailed description of certain specific embodiments of the invention.
Video Editing on Smartphone With the improvement of computing power of smartphones, editing videos can be performed on a smartphone. However, for better management of smartphone resources, and for more sophisticated video editing, it may be desirable to delegate video editing tasks to a computer having more resources and more video editing functionalities. The present invention provides a video editing system and method that utilize at least one mobile terminal for user interface and at least one remote computer for editing user videos.
User Instructions on Mobile Terminal and Video Editing on Server Referring to FIG. 1, a mobile terminal 100 is connected to a server 200 wired or wireless via the Internet or information network 300. The mobile terminal 100 includes a mobile application for video editing. The server 200 includes software for editing user videos. In embodiments, a user enters video editing instructions to the mobile application. The mobile application of the mobile terminal 100 presents a preview for the user's review and confirmation. In response to the user's confirmation for editing, the mobile application of the mobile terminal 100 sends a video editing request to the server 200. In response to the video editing request, the server 200 performs editing of the user video and generates a resulting edited video.

Figure 2:
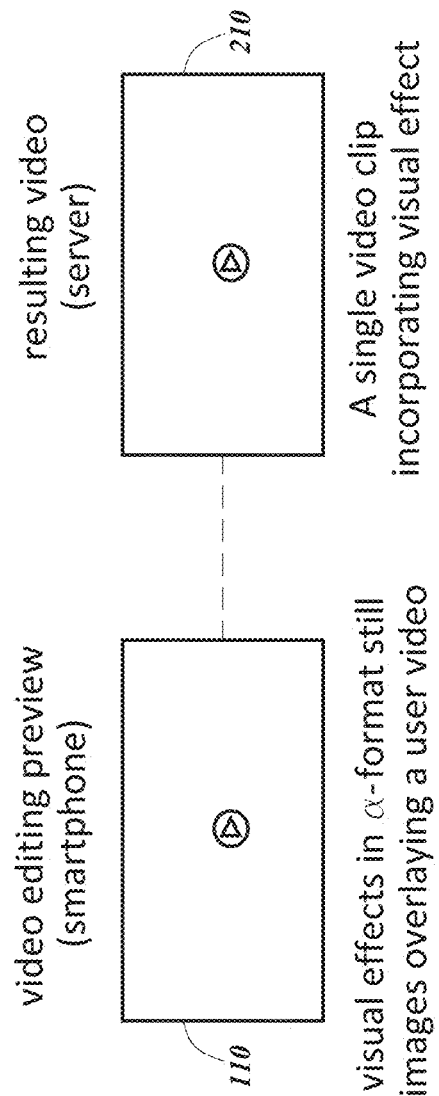
FIG. 2 illustrates a video editing preview on a mobile terminal and corresponding video editing on a server according to embodiments.

As illustrated in FIG. 2, in embodiments, the resulting video 210 generated by the server 200 corresponds to the preview 110 presented on the mobile terminal 100 in a manner in which for each visual effect included in the preview 110, the resulting video 210 includes a corresponding visual effect. The resulting video 210 is a single video clip superimposing the user video and at least one visual effect. On the other hand, the corresponding preview is not a single video clip and rather a visual representation of the user video along with still images that correspond to the at least one visual effect. In embodiments, to present the preview of video editing, the mobile terminal 100 stores still images of visual effects. On the other hand, the server 200 stores video clips that correspond to the still images stored in the mobile terminal's library.

Video Editing System

Figure 3:
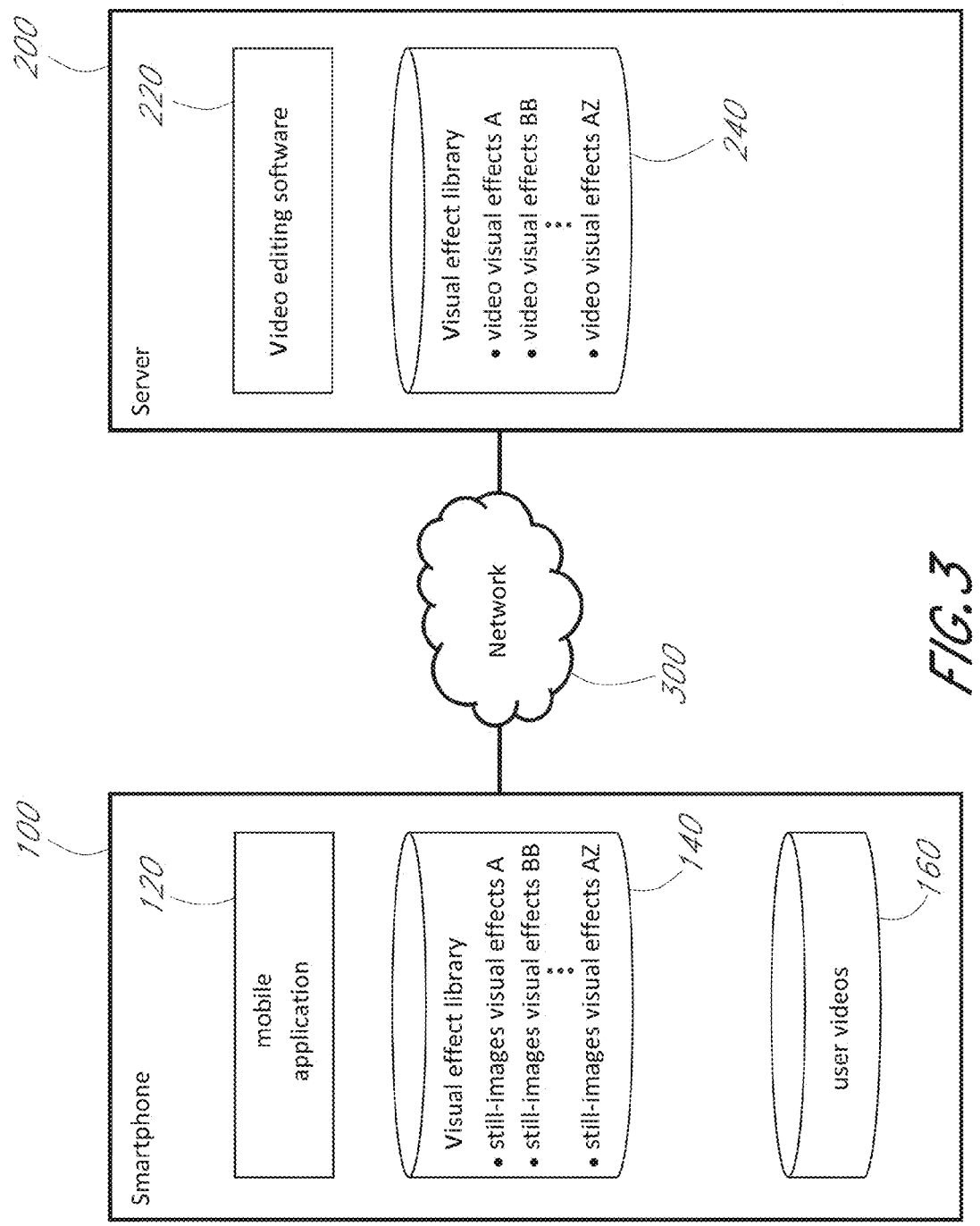
FIG. 3 illustrates components of a video editing system according to embodiments.

FIG. 3 illustrates components of the mobile terminal 100 and the server 200 of a video editing system according to embodiments. The mobile terminal 100 includes a mobile application 120, a visual effect library 140 and a user video storage 160. The server 200 includes video editing software 220 and a visual effect library 240.

Mobile Terminal

In this disclosure, the term "mobile terminal" refers to mobile consumer electronic devices, such as smartphones, tablet computers, laptop computers, wearable computing devices, and other mobile computing devices. In embodiments, the mobile terminal includes a display, a user input device, a memory and at least one processor for executing software. In some embodiments, the mobile terminal includes a touch screen display although not limited thereto.

Server

In this disclosure, the term "server" refers to one or more computers that are typically stationary rather than mobile, although not limited thereto. In some embodiments, the server is at least one networked computer of a service provider for providing video editing services.

Mobile Application

The mobile application 120 is software installed on mobile terminal 100 and capable of accessing components of mobile terminal 100 for providing user interfaces for video editing. The mobile application 120 communicates with the video editing software 220 of the server 200 for delegating a video editing task to the server 200. The mobile application 120 provides user interfaces for receiving user commands for video editing, providing a video editing preview, and playing an edited or resulting video from the server 200.

Visual Effect Library of Mobile Application

Figure 4:
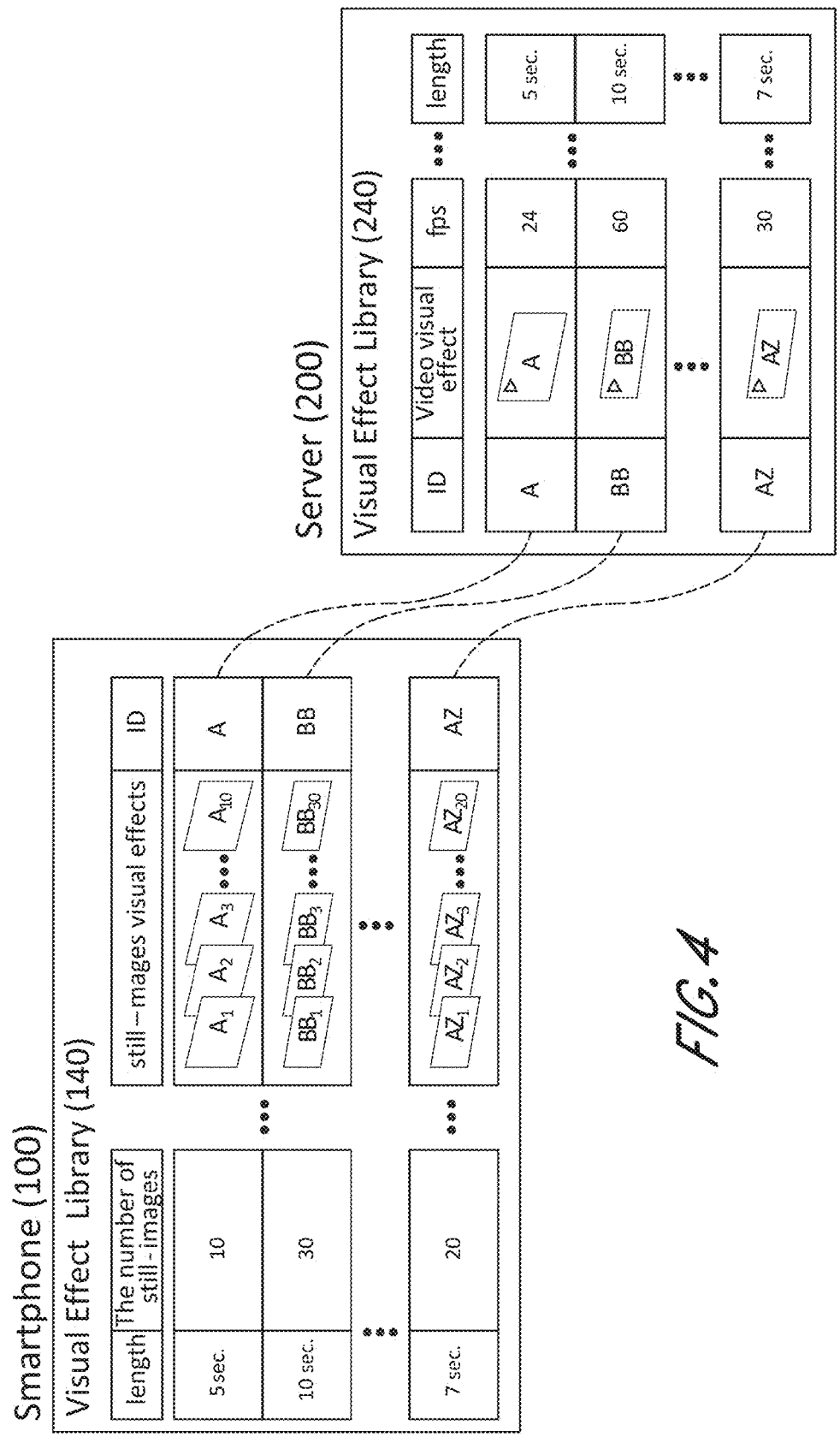
FIG. 4 illustrates a visual effect library on a mobile terminal and a corresponding visual effect library on a server according to embodiments.

The visual effect library 140 is data store of visual effects for use in the mobile application 120. In embodiments, the visual effect library 140 stores a plurality of sets of still images, in which each set of still images represents one visual effect. As illustrated in FIG. 4, the visual effect library 140 further stores information and data relating to the visual effects (A, BB, . . . AZ). For each visual effect, in embodiments, the visual effect library 140 stores an identification (ID), an accompanying sound recording, the number of still images (image count), etc. In other embodiments, the visual effect library 140 includes addresses or locations of the still images for each visual effect.

Visual Effects

In the present disclosure, the term "visual effect" or "visual effects" refer to one or more visual objects for adding to a user video. The visual object may be stationary or moving on a screen. The visual object may be colored and translucent, but not a filter to apply to a full screen of frames of the user video. When added to the user video, a visual effect may accompany with a sound recording.

Still Images for Visual Effects

A set of still images for each visual effect are snapshots or frames of a corresponding visual effect video. In embodiments, each still image includes one or more non-transparent objects or portions on a transparent background, referred to as an alpha (α) format still image. The still images of a visual effect are to be overlaid over user video frames on the mobile application 120 in a preview without forming an integrated video.

User Video Storage

The user video storage 160 is data store for user videos. In embodiments, the user videos stored in the user video storage 160 include videos captured at the mobile terminal 100 and/or videos downloaded from other sources.

Video Editing Software of Server

The video editing software 220 is software of the server 200 for performing video editing tasks based on a request from the mobile application 120. Video editing by the video editing software 220 is, among others, combining a user video and at least one visual effect video such that the resulting video is in a single file and the visual effect video overlaps some frames of the user video.

Visual Effect Library of Server

The visual effect library 240 is server-side data store of visual effects. In embodiments, the visual effects library 240 of the server 200 stores video clips for visual effects (A, BB, . . . , AZ), e.g., one video clip for a visual effect. As illustrated in FIG. 4, the visual effect library 240 further stores information and data relating to the visual effects such as an identification (ID), a frame rate of the video clip (frame per second, fps), an accompanying sound recording, etc.

Video Clips for Visual Effects

Each video clip for a visual effect includes a transparent background and one or more non-transparent objects or portions, referred to as an alpha (α) format video clip. The frames of the video clip are to be integrated with user video frames to form a single edited video by video editing. In embodiment, alpha (α) format that supports an alpha (α) channel for storing transparency information of each pixel is used for the visual effect video clip.

Visual Effects in Visual Effect Libraries of Mobile Terminal and Server

Referring to FIG. 4, in embodiments, each visual effect has still image data in the mobile terminal 100 and video data in the server 200. With regard to the visual effect A, for example, a series of still images ($A_1$-$A_{10}$) are stored in the visual effect library 140 of the mobile terminal 100, and a video clip (A) is stored in the visual effect library 240.

Relationship Between Video Clip and Still Images

For each visual effect, the video clip stored in the server 200 directly corresponds to the still images stored in the mobile terminal. In some embodiments, the still images $A_1$-$A_{10}$ are a subset of frames selected from the corresponding video of visual effect A. In some embodiments, each still image is a snapshot or frame of the video clip or a modified or simplified version of the snapshot or frame. In embodiments, for each visual effect, the number of still images (image frame count) is substantially less than the number of frames in the corresponding video (video frame count). For example, the video frame count is 5, 10, 20, 30, 40, 50, 60, 70, 80, 90, 100 and 200 times greater than the image frame count for the visual effect. In embodiments, the ratio of the video frame count to the image frame count is in a range formed by any two numbers listed in the previous sentence.

Example Video Editing

FIG. 5 illustrates an example timeline of video editing according to embodiments, in which a user video for editing runs from $t_0$ through $t_6$. In the illustrated example, the visual effect A 520 is superimposed over the user video 510 from $t_1$ to $t_3$, and the visual effect B 530 is superimposed over the user video 510 from $t_2$ to $t_5$. In the example, between $t_2$ and $t_3$, both visual effect A and visual effect B are superimposed with the user video 510.

Example Video Editing Procedure

FIG. 6 illustrates an example procedure of video editing. First, a user activates the mobile application 120 on the mobile terminal 100. Then, at 610, the user selects a user video 510. Subsequently, at 620 the user selects a visual effect and at 630 selects parameters for adding the visual effect to the selected user video. In embodiments, the user may add more than one visual effect as in FIG. 5. Subsequently, at 640 the mobile application 120 plays a preview for the user's review and confirmation of adding the visual effects. In response to confirmation, at 650, the mobile application generates a video editing request for sending to the server 200 at 660. In response to the video editing request, at 670 the server 200 edits the user video in accordance with the request. Subsequently, at 680 completion of the video editing is notified to the mobile application 120, and at 690 the user may play the edited video on the mobile application 120

Selecting User Video

At 610 the user selects a user video from user videos stored in the user video storage 160. In response, the mobile application 120 displays a scene of the user video 510 and provides a user interface for navigating a timeline of the selected user video 510. In the alternative to selecting one from the user video storage 160, the user may select a video for editing from the Internet or a network. Then, the mobile application 120 may download the selected user video or part of the selected video for displaying on its user interface.

Selecting Visual Effect and Setting Parameters

At 620, the user selects one or more visual effects to add to the user video. In embodiments, the mobile application 120 provides a user interface for selecting a visual effect from the visual effects available in the visual effect library of the mobile terminal 100. Subsequent to selection of each visual effect, e.g. visual effect A, at 630, the user sets one or more parameters for the selected visual effect A via the user interface of the mobile application 120. In embodiments, the parameters include time frame (start-end), size, orientation, location within the screen, and display strengths (degree of transparency) of the visual effect A. As the user selects visual effects and their parameters, the mobile application 120 saves the user selections and settings.

Preview

Subsequently, at 640, a preview of video editing may be displayed at the user's request. In embodiments, the preview is a play of the selected user video along with the still images of the selected visual effects that are superimposed over the user video frames in accordance with the user's setting of the parameters. In embodiments, the preview is not an integrated video, in which the still images are incorporated or integrated with the user video. In other embodiments, at least part of the still images may be integrated with or incorporated into the user video to provide the preview. The user may approve the preview or goes back to steps 620 and 630 for changes.

Request for Video Editing

Subsequently at 650, the mobile application 120 generates and sends a video editing request to the server 200 at the user's command. The video editing request includes details of the user's selections and settings for video editing. In embodiments, the video editing request includes the selected user video, identification of selected visual effect and parameters for each visual effect. In some embodiments, the video editing request includes identification or location information of the user video rather than including the user video data itself.

Video Editing at Server

At 670, the video editing software 220 of the server 200 performs video editing in accordance with the video editing request from the mobile application 120. The video editing software 220 retrieves the selected user video if needed. Also, the video editing software 220 retrieves the video clip for each visual effect identified in the video editing request. Then, the video editing at the server 200 relates to combining the video clip of the selected visual effect with the selected user video as specified by the parameters included in the request from the mobile application 120.

Combining Videos to Add Visual Effects

During video editing, the video editing software 220 superimposes frames of the video clip of the selected visual effect over frames of the user video based on the timeframe specified in the video request. Specifically, in the video editing, a frame of the visual effect video clip and a frame of the user video are integrated as a single frame such that the video editing results in a single integrated video incorporating visual effect from the video clip in the user video. To do the frame-by-frame integration, in some embodiments, the video editing software 220 may determine if the frame rates of the user video and visual effect video clip and adjust the frame rate of the visual effect video clip to match the frame rate of the user video.

Example Mobile Application Interfaces

Figure 7E:
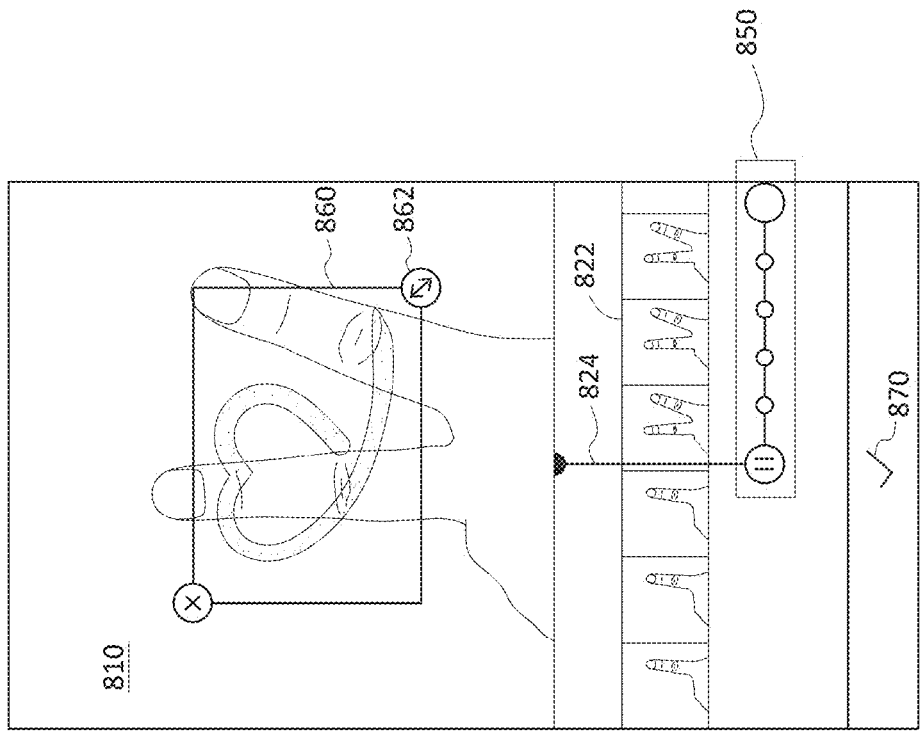
FIG. 7E illustrates an interface of mobile application when a visual effect is selected to be added to a user video according to embodiments.

FIGS. 7A-7E illustrate example user interfaces of the mobile application 120 for video editing. Referring to FIG. 7A, a first window 810 of the mobile application 120 displays the starting frame ($t_0$) of the user video 510. A second window 820 of the mobile application 120 displays a video time-bar 822 showing frames of the user video 510. In the second window 820, the mobile application 120 provides an indicator 824 indicating position of the current frame (scene) displayed in the first window 810 on the video time-bar 822. The mobile application 120 graphical provides icons 830 representing video editing available in the mobile application. Each of the icons 830 represents color adjusting, adding background music, overlaying visual effects, and trimming. In FIG. 7B, the mobile application 120 displays the first scene ($t_1$) of the user video 510 as the user moves the video time-bar 822.

Figure 7D:
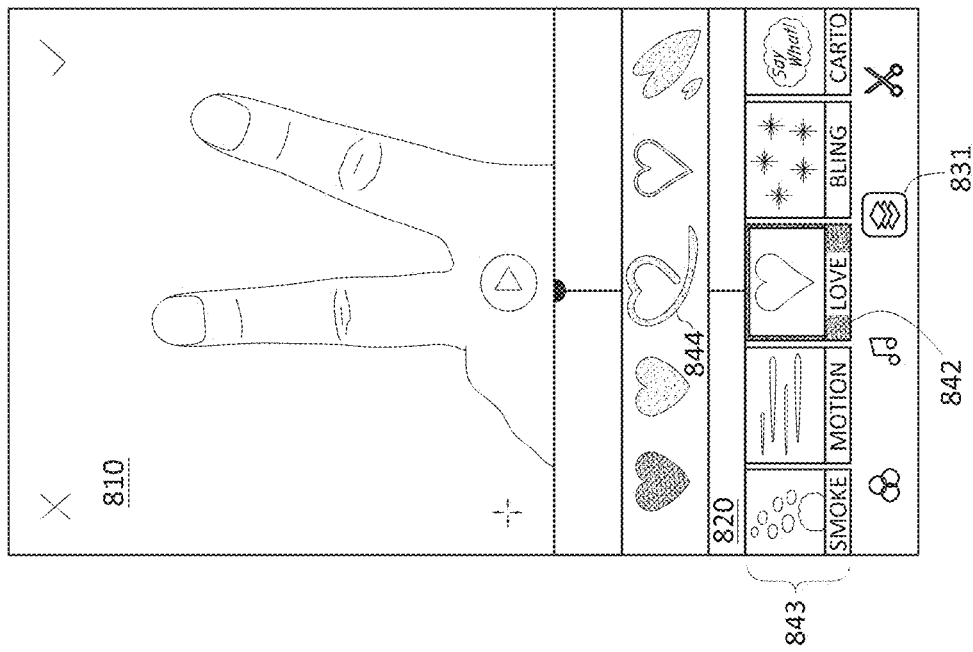
FIG. 7D illustrates an interface of mobile application when a user enters a command for adding a visual effect using according to embodiments.

FIG. 7C-7E illustrates interface of the mobile application 120 when the user selects the visual effect A and selecting parameters of the visual effect A at the steps of 620 and 630. In FIG. 7C, the mobile application 120 displays multiple icons 840 showing visual effect categories available when the user selects an icon 831 of overlaying visual effects among the icons 830. In FIG. 7D, the mobile application 120 displays multiple icons 843 representing visual effects in the selected category when the user selects an icon 842 representing heart-shape visual effects.

When the user selects the icon 844 (representing the Visual Effect A 520) the mobile application 120 displays a con 860 indicating location and size of the visual effect A in the first window 810 over a scene of the user video 510. The mobile application 120 displays a time line 850 for indicating start/end of the visual effect A. The timeline 850 is sized and aligned with the video time-bar 822 for indicating a corresponding portion of the user video 510 where the visual effect A will be combined. In embodiments, the mobile application 120 provides the icon of the Visual Effect A using at least one form the still images $A_1$-$A_{10}$. In embodiments, the user can set a starting point of the visual effect by moving the time line 850 relative to the time bar 822 of the user video. In some embodiments, the user can adjust size of the visual effect A by dragging a size-adjusting mark 862 provided along with the icon 860. When the user selects the confirm icon 870 the mobile application 120 provides a preview of the visual effect A over the user video 510.

Presentation of Visual Effect in Preview

Figure 8A:
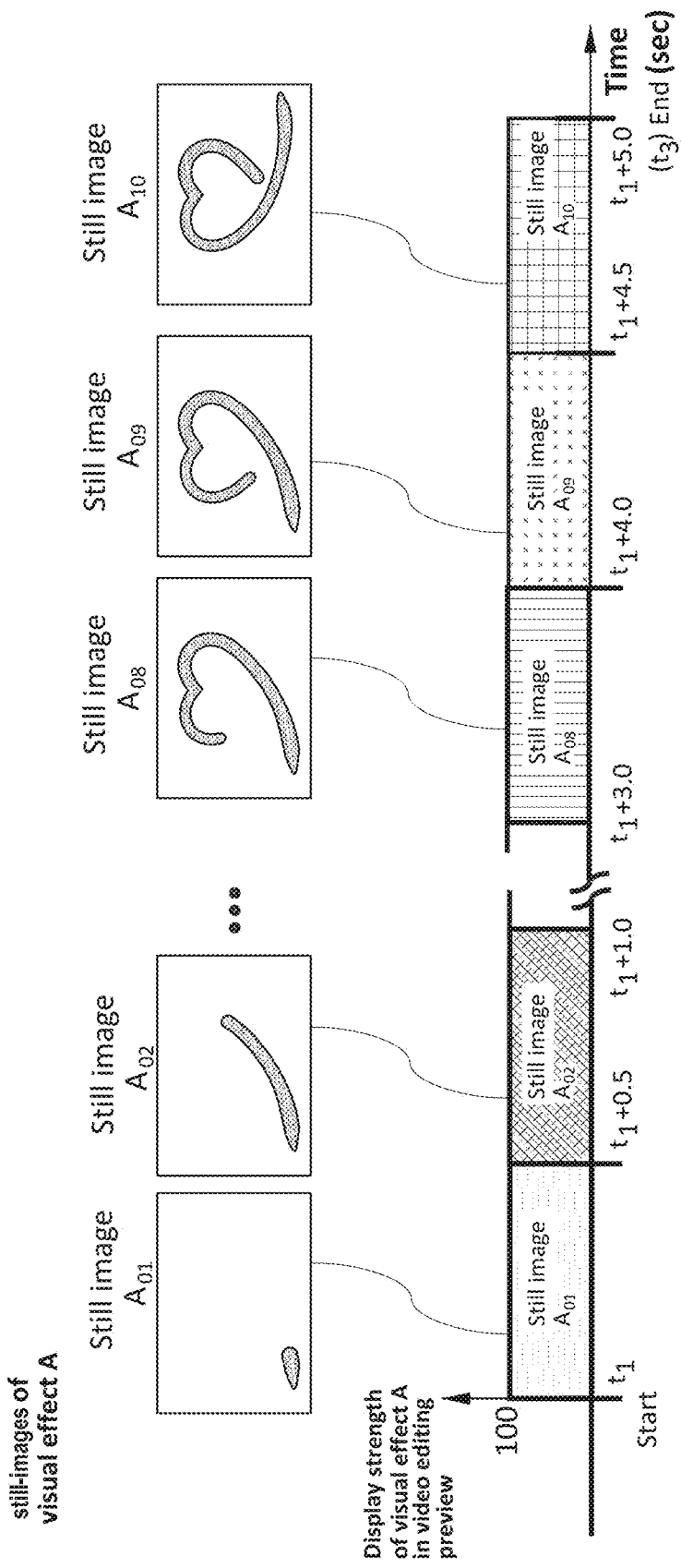
FIG. 8A illustrates an example timeline of displaying still images of visual effect according to embodiments.

FIG. 8A illustrates an example timeline of displaying still images of a visual effect A (FIG. 5) in a preview. The visual effect A begins at $t_1$ and continues until $t_3$ ($t_1$+5 second). In the illustrated example of FIG. 8A, each still image stays for 0.5 sec. in the preview such that each still image is presented along with multiple frames of the user video 510. Specifically, in the first time segment from $t_1$ to $t_1$+0.5, the first still image $A_{01}$ is displayed over the frames of the user video 510 in the same time segment. For the following segment, from $t_1$+0.5 to $t_1$+1.0, the second still image till image $A_{02}$ is displayed over the frames of the user video 510 in the same time segment. In other embodiments, based on user settings and/or input, the time segment for each still image may change.

Showing Still Images in Preview

In some embodiments, the mobile application 120 displays the still images $A_1$-$A_{10}$ one after another in sequence without overlapping with each other as in FIG. 8A. In other embodiments, as in FIG. 8B, two or more still images may be displayed at a given time during preview. In some embodiments, the transparency (display strength) of the object(s) included in each still image is constant and does not change over time during the time segment in which the particular still image is presented in the preview. In other embodiments, the transparency (display strength) of the object(s) included in each still image changes over time during the time segment in which the particular still image is presented in the preview.

On-Off Display Strength (Transparency) of Objects in Still Image

In the example of FIG. 8A, each of the still images $A_{01}$-$A_{10}$ is displayed at either of 100% displays strength and 0% displays strength during display of the visual effect A in preview. For example, still image $A_{01}$ is at 100% during the first time segment and at 0% for the rest of time segments. Display strength of 100% is 0% transparency, which is to display the object(s) of each still image as original. Display strength of 0% corresponds 100% transparency, which will result in no display of the object(s) of visual effect. In embodiment, alpha ($\alpha$) format that supports an alpha ($\alpha$) channel for storing transparency information of each pixel of the still images are used for changing displays strength.

Staggering Display Strength and Overlapping Display of Still Images

Figure 8B:
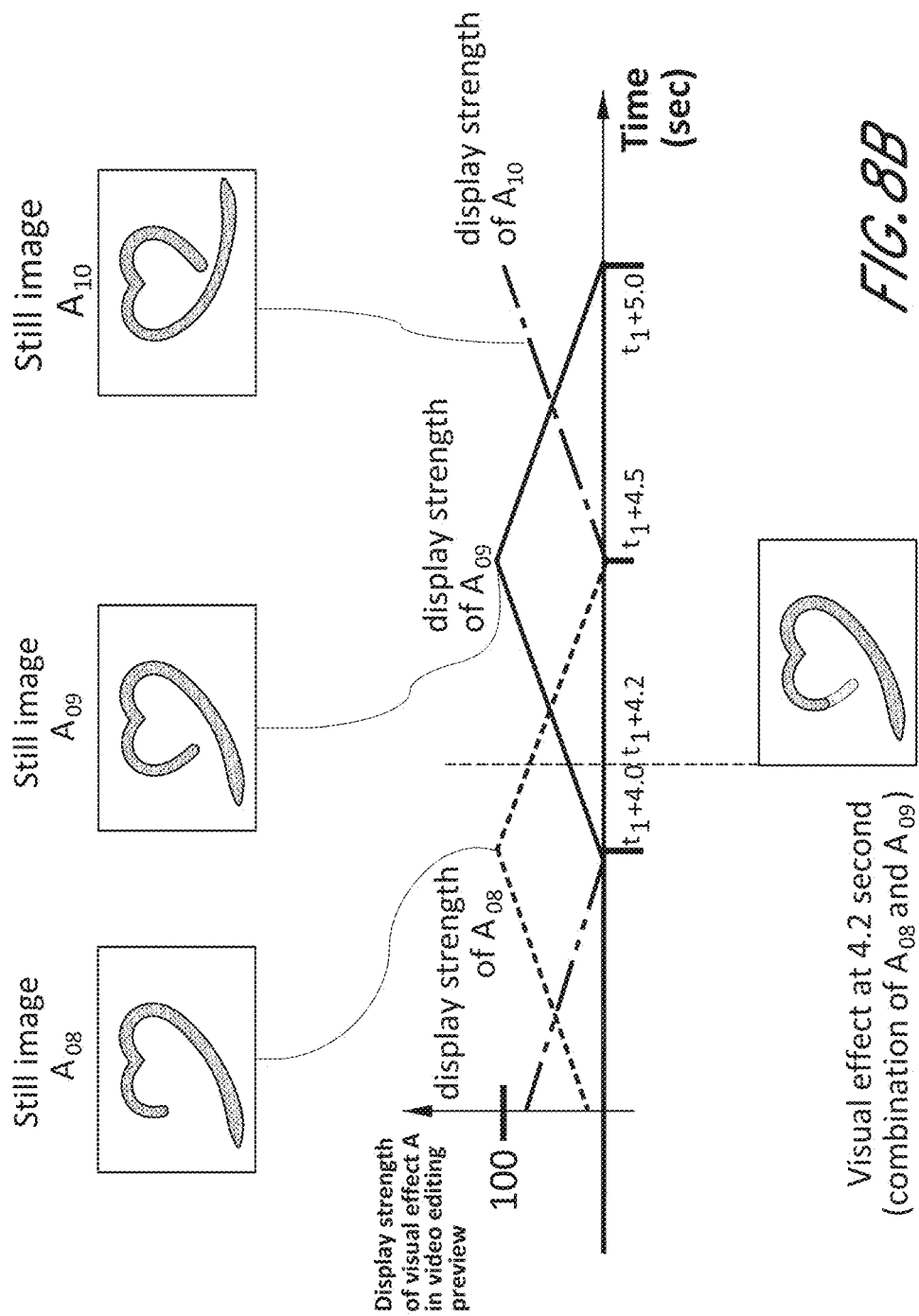
FIG. 8B illustrates an example timeline of displaying still images of visual effect according to embodiments.

In the example of FIG. 8B, the still image $A_{09}$ is displayed in the time segment between $t_1$+4.0 and $t_1$+5.0. The display strength of the still image $A_{09}$ gradually increases (fade-in) to its peak at $t_1$+4.5 and then gradually decreases (fade-out) until $t_1$+5.0. From $t_1$+4.0 to $t_1$+4.5, the still image $A_{09}$ is displayed together with the still image $A_{08}$ as the still image $A_{08}$ fades out. Similarly, from $t_1$+4.5 to $t_1$+5.0, the still image $A_{09}$ is displayed together with the still image $A_{10}$ as the still image $A_{10}$ fades in. In the illustrated example, while ending of still image $A_{08}$ an beginning of still image $A_{10}$ coincide at the time $t_1$+4.5, in other embodiments, beginning of still image $A_{10}$ may be delayed such that there is some time period in which only the still image $A_{09}$ is displayed as visual effect along with the user video frames. Also, in other embodiments, the still image $A_{10}$ may begin before complete disappearance of the still image $A_{08}$. The overlapping display and staggering display strength individually and in combination are advantageous as the display of these still images can generate smoother motions with a smaller number or count of still images than the on-off display strength as illustrated in FIG. 8A.

Visual Effect Changing Locations

Figure 10C:
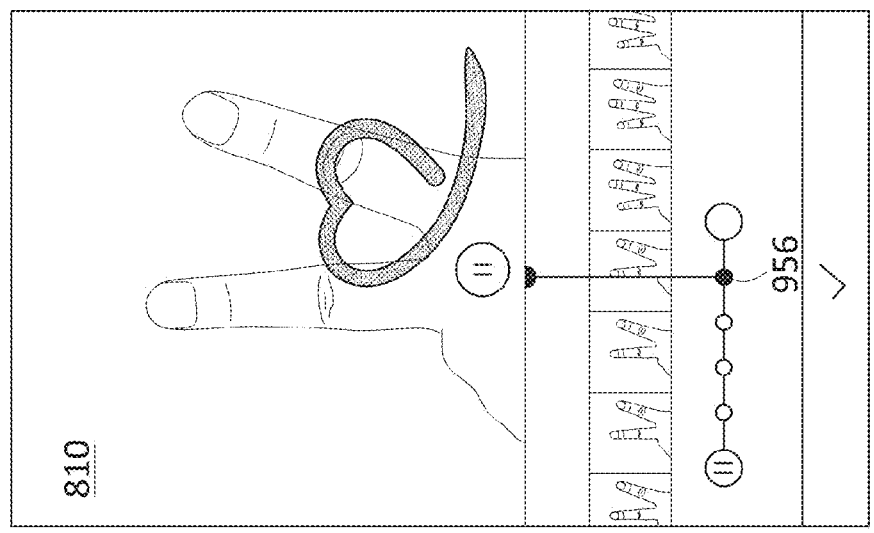
FIGS. 10A-10C illustrate a preview of visual effect changing its locations according to embodiments.
Figure 10B:
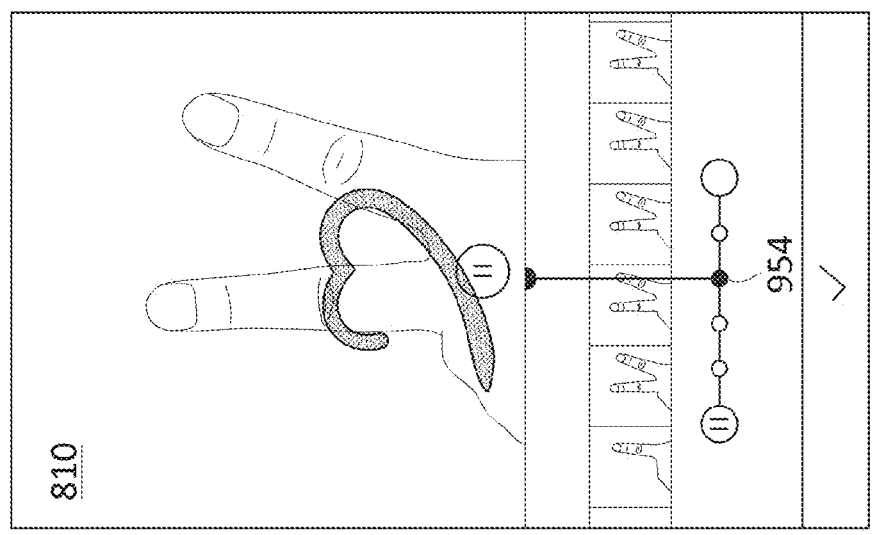
Figure 10A:
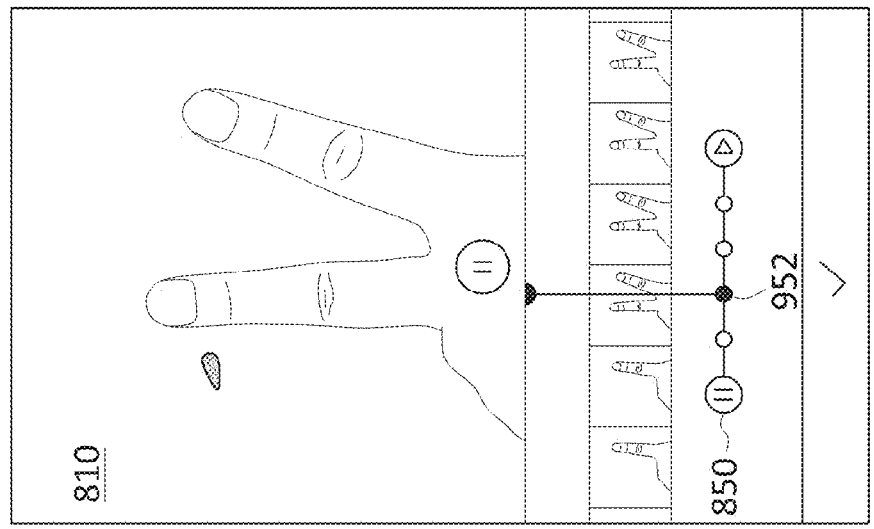

FIGS. 9A to 9C illustrates setting different locations of the visual effect A at multiple points of the timeline of user video. FIGS. 10A to 10C illustrates a preview of the visual effect A changing its locations along the timeline of the user video. Referring to FIGS. 9A to 9C, visual effect icons 962, 964, 966 represent a visual representation of the visual effect A at corresponding points 952, 954, 956 in the timeline 850. The user can adjust location of the visual effect A at the point 952 by moving the moving visual effect icons 962 as in FIG. 9A. Similarly, the user can change locations of the visual effect A at the points 954, 956 in the timeline 850 by moving the icons 964, 966. For each of the points 952, 954, 956 the mobile application 120 stores the location of the visual effect as part of meters for video editing. The mobile application 120 includes the stored locations in a request for server-side video editing. Based on the request, the server 200 generates a resulting video in which the visual effect A moves along a trace connecting the multiple locations of 962, 964, 966. In some embodiment, parameters of the visual effect A for overlaying include different settings of the visual effect A at two or more points in the timeline of the visual effect A.

Mobile Application—Not performing Video Editing by Itself

In embodiments, mobile application 120 does not perform, by itself, a video editing to combine visual effects to user videos because such video editing task is too heavy for limited computational power of the mobile terminal 100. Instead, the mobile application 120 provide of a video editing and delegates the video editing to the server 200 to take advantage of computational power of the server 200. In embodiments, a preview of visual effects is provided using-still-images representing the visual effects without using a video clip of the visual effects. Process of providing a video editing preview is not a simplified version of corresponding video editing at the server because the mobile application 120 does not modify the user video or create a new video file incorporating the visual effects to the user video.

Modifications, Combinations and Sub-Combinations

Although the invention has been disclosed in the context of certain embodiments and examples, it will be understood by those skilled in the art that various features and aspects of the present invention extend beyond the specifically disclosed embodiments to other alternative embodiments. In addition, while a number of variations have been shown and described in detail, other modifications, which are within the scope of the invention, will be readily apparent to those of skill in the art based upon this disclosure. It is also contemplated that various combinations or sub-combinations of the specific features and aspects of the embodiments may be made and still fall within the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, and that various changes in form and details may be made without departing from the spirit and scope of the present disclosure as set forth in the following claims.

What is claimed is:

1. A computer-readable memory storing mobile application software wherein, when executed in a smartphone, the mobile application software is configured to perform a method comprising:

receiving, on the smartphone, a user command for selecting a user video for editing;

receiving, on the smartphone, at least one user command for adding a first visual effect among a plurality of predetermined visual effects to the selected user video, wherein adding involves selecting the first visual effect, selecting a first time window for adding the first visual effect within a time span of the selected user video;

subsequently displaying, on the smartphone, a preview emulating an edited version of the selected user video without generating a video clip of the edited version locally in the smartphone such that, in displaying the preview, a first series of alpha-format still images corresponding to the first visual effect is superimposed over the selected user video according to the at least one user command without performing frame-by-frame integration of the selected user video and the first series of alpha-format still images;

in response to a user's confirmation of the preview, transmitting by the smartphone to at least one remote computer, command data for generating the edited version in the at least one remote computer such that a first alpha-format video corresponding to the first visual effect is superimposed over the selected user video to provide the first visual effect in the first time window; and receiving, on the smartphone, the edited version from the at least one remote computer, wherein each still image of the first series of alpha-format still images comprises a non-transparent presentation of the first visual effect with a transparent background, wherein the first alpha-format video comprises a non-transparent presentation of the first visual effect with a transparent background, wherein the number of frames of the first alpha-format video during the first time window is greater than the number of still images of the first series of alpha-format still images during the first time window.

2. The computer-readable memory of claim 1, wherein the command data identifies the selected user video, identifies the first visual effect, specifies the first time window for adding the first visual effect within the time span of the selected user video, and specifies at least one location for adding the first visual effect within the presentation of the selected user video.

3. The computer-readable memory of claim 1, wherein the first series of alpha-format still images comprises a first alpha-format still image and a second alpha-format still image immediately following the first alpha-format still image, wherein at a first point of the preview, the first alpha-format still image is displayed alone, wherein at a second point of the preview following the first point, the first and second alpha-format still images are displayed together.

4. The computer-readable memory of claim 3, wherein at a third point of the preview following the second point, the second alpha-format still image is displayed alone.

5. The computer-readable memory of claim 3, wherein at the second point of the preview, display strength of the first alpha-format still image is lower than display strength of the first alpha-format still image displayed at the first point of the preview such that the first alpha-format still image fades out over time from the first point to the second point.

6. The computer-readable memory of claim 3, wherein at a third point of the preview following the second point, the second alpha-format still image has a display strength greater than that of the second alpha-format still image at the second point of the preview such that the second alpha-format still image fades in over time from the second point to the third point.

7. The computer-readable memory of claim 1, wherein in displaying the preview, individual still images in the first series of alpha-format still images are displayed at a regular time interval in sequence.

8. The computer-readable memory of claim 1, wherein during the preview, each still image of the first series of alpha-format still images is presented with multiple frames of the selected user video.

9. The computer-readable memory of claim 1, wherein the command data from the smartphone comprises an identification of the first series of alpha-format still images, wherein the at least one remote computer identifies the first alpha-format video using the identification of the first series of alpha-format still images.

10. The computer-readable memory of claim 1, wherein each of the first series of alpha-format still images is stored locally on the smartphone, and wherein each of the first series of alpha-format still images is associated with an identification of the first visual effect.

11. The computer-readable memory of claim 1, wherein the mobile application software does not have capability of video editing to combine the first alpha-format video of the first visual effect and the selected user video into a single video clip while being capable of causing the smartphone to display the preview using the first series of alpha-format still images.

12. The computer-readable memory of claim 11, wherein when executed in the smartphone, the mobile application software is configured to cause the smartphone to present the preview using a first visual effect library stored locally on the smartphone, the first visual effect library comprising the first series of alpha-format still images.

13. The computer-readable memory of claim 1, wherein to generate the edited version, the at least one remote computer performs frame-by-frame integration of the first alpha-format video and the selected user video.

14. The computer-readable memory of claim 13, wherein the at least one remote computer adjusts a frame rate of the first alpha-format video to match the frame rate of the selected user video.

15. The computer-readable memory of claim 1, wherein to generate the edited version, the at least one remote computer combines the first alpha-format video of the first visual effect and the selected user video to generate the edited version in a single video clip in accordance with the command data from the smartphone.

16. The computer-readable memory of claim 15, wherein the command data from the smartphone comprises an identification of the first series of alpha-format still images, wherein the at least one remote computer identifies the first alpha-format video using the identification of the first series of alpha-format still images.

17. The computer-readable memory of claim 15, wherein the at least one remote computer generates the edited version using a second visual effect library stored locally on the at least one remote computer, the second visual effect library comprising the first alpha-format video of the first visual effect, wherein the first alpha-format video is associated with an identification of the first visual effect.

18. The computer-readable memory of claim 17, wherein the command data from the smartphone comprises an identification of the first series of alpha-format still images, wherein the at least one remote computer identifies the first alpha-format video from the second visual effect library using the identification of the first series of alpha-format still images.

19. The computer-readable memory of claim 18, wherein to generate the edited version, the at least one remote computer performs frame-by-frame integration of the first alpha-format video and the selected user video.

20. The computer-readable memory of claim 19, wherein the at least one remote computer adjusts a frame rate of the first alpha-format video to match the frame rate of the selected user video.

\* \* \* \* \*